United States Patent [19]
Yoshikawa et al.

[11] Patent Number: 5,264,295
[45] Date of Patent: Nov. 23, 1993

[54] COMBINED BODY OF CERAMICS AND METAL

[75] Inventors: Takaya Yoshikawa, Kasugai; Noboru Ishida, Kagamihara, both of Japan

[73] Assignee: NGK Spark Plug Co., Ltd., Nagoya, Japan

[21] Appl. No.: 74,150

[22] Filed: Jun. 9, 1993

Related U.S. Application Data

[63] Continuation of Ser. No. 738,640, Jul. 31, 1991, abandoned.

Foreign Application Priority Data

Aug. 3, 1990 [JP] Japan .................. 2-207122

[51] Int. Cl.⁵ .................. F01D 5/30; F16D 1/00
[52] U.S. Cl. .................. 428/614; 428/627; 428/161; 416/241 B; 403/30; 403/404
[58] Field of Search ........... 428/621, 627, 632, 633, 428/614, 457, 469, 161; 403/29, 30, 273, 404; 416/241 B

[56] References Cited

U.S. PATENT DOCUMENTS

| | | | |
|---|---|---|---|
| 1,940,870 | 12/1933 | Litton | 403/29 |
| 2,317,338 | 4/1943 | Rydmark | 416/241 B |
| 2,874,932 | 2/1959 | Sörenson | 416/241 B |
| 4,051,585 | 10/1977 | Walker et al. | 29/156.8 R |
| 4,471,008 | 9/1984 | Hutner | 416/241 B |
| 4,697,325 | 10/1987 | Kamingaito et al. | 416/241 B |
| 4,917,953 | 4/1990 | Hioki et al. | 427/228 |
| 4,942,999 | 7/1990 | Oda et al. | 428/635 |
| 5,028,162 | 7/1991 | Tsuno et al. | 403/30 |
| 5,066,547 | 11/1991 | Ishida et al. | 416/241 B |
| 5,089,312 | 2/1992 | Kawase et al. | 428/161 |
| 5,104,747 | 4/1992 | Makino et al. | 428/621 |

FOREIGN PATENT DOCUMENTS 61-176231 11/1986 Japan .
2-169803 6/1990 Japan .................. 416/241 B

*Primary Examiner*—John Zimmerman
*Attorney, Agent, or Firm*—Sughrue, Mion, Zinn, Macpeak & Seas

[57] ABSTRACT

The invention provides an improved combined body of ceramics and metal which maintains high anti-torsional strength and anti-slip off strength while stress concentration is relaxed and deterioration of the ceramics is well prevented. The combined body includes a ceramic member inserted into and firmly engaged with a recess or an opening of a metal member. The combined body has a treated surface region in the vicinity of an engagement end of a contact surface of either the ceramic member or the metal member, and an untreated surface region at a location other than the vicinity of the engagement end.

18 Claims, 6 Drawing Sheets

PRIOR ART

COMBINED BODY OF CERAMICS AND METAL

This is a continuation of application Ser. No. 07/738,640 filed Jul. 31, 1991, now abandoned.

BACKGROUND OF THE INVENTION

The present invention relates to a combined body of ceramics and metal used for, for example, turbocharger rotors.

Figure 6:
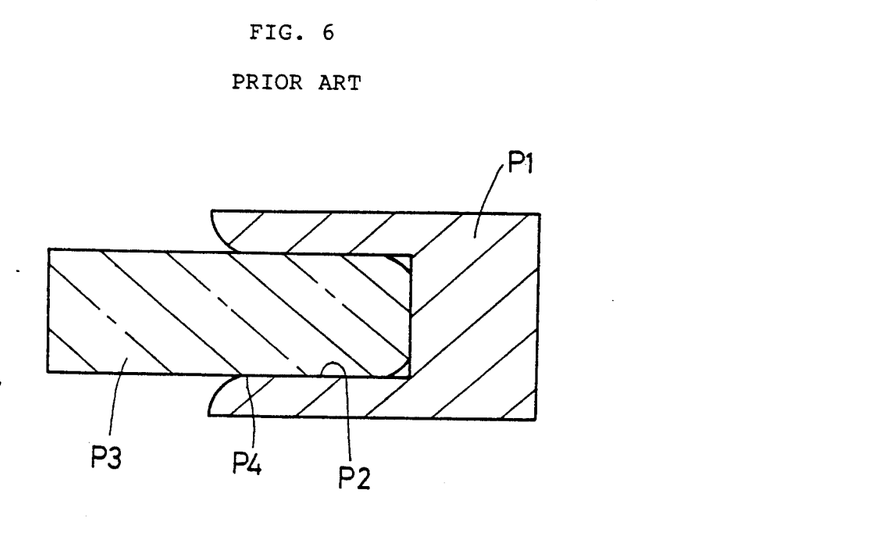
FIG. 6 is a cross sectional view illustrating a prior art.

A combined body of ceramics and metal used for turbocharger rotors or turbine rotors generally consists of a metal member P1 with a recess or through hole P2 which a ceramic member P3 is inserted into and engaged with as shown in FIG. 6.

On the combined body of such structure, however, a compressive force is applied onto an end of contact surface between the metal member P1 and the ceramic member P3, that is, an engagement end P4, and an extremely large stress is thereby concentrated on the ceramic member P3. Such extreme stress concentration unfavorably lowers the strength of the combined body. Furthermore, because of a large axial tractive force of the combined body, repeated load stress or thermal stress to the combined body causes fatigue and deterioration of the ceramics and drastically lowers the strength thereof.

Several methods have been proposed to relax the stress concentration or lower the axial tractive force by changing the shape or structure of the engagement end of the combined body or by surface treatment of the contact face with molybdenum disulfide; but they do not sufficiently solve the problems described above.

Examples of the former methods for relaxing the stress concentration include smoothing the engagement end of the contact surface between the ceramic member and the metal member before binding and forming a groove on the circumference of a sleeve on the engagement end (see Published Unexamined Japanese Utility Model No. Sho-61-176231). Such methods, however, require high working accuracy, increase working steps, and limit the degree of freedom for design.

The latter methods for relaxing the stress concentration include covering the combined body of metal and ceramics with a layer of molybdenum disulfide to reduce the frictional resistance. This method lowers an anti-torsional strength and an anti-slip off strength while relaxing the stress concentration. Although the long contact face may prevent the decrease of those strengths, the method increases the weight of the combined body and is not applicable to some parts such as turbochargers due to limitation of design.

SUMMARY OF THE INVENTION

An objective of the invention is thus to provide an improved combined body of metal and ceramics with sufficient strength.

Another objective of the invention is to provide a combined body of ceramics and metal, which maintains high anti-torsional strength and anti-slip off strength while relaxing stress concentration and preventing deterioration of the ceramics.

A further objective of the invention is to provide a combined body of ceramics and metal which is favorably used for turbochargers or gas turbines.

The above and other related objectives are realized by a combined body of ceramics and metal prepared by engaging an extension of a ceramic member with a recess or an opening of a through hole of a metal member and firmly binding the ceramic member to the metal member with pressure of the respective contact surfaces, in which at least one of the contact surfaces of the metal and ceramic members has a treated surface region with a small frictional coefficient in the vicinity of an engagement end thereof and at least one of the contact surfaces has an untreated surface region at a location other than the vicinity of the engagement end. The combined body of ceramics and metal of the invention includes an untreated surface region occupying thirty five to ninety five percent of the one of the contact surfaces.

The ceramic member and the metal member may be bound to each other by pressure insertion, thermal engagement or cold engagement.

The untreated surface region may be of various shapes but preferable shapes are a circumferential band along the cylindrical contact surface or spots on part of the contact surface since the stress is applied uniformly.

The untreated surface region of a band shape has a width giving an appropriate frictional force, which corresponds to thirty five to ninety five percent of a length l of the contact surface.

The surface treatment for decreasing the frictional coefficient includes plating, vacuum evaporation, or sputtering of a metal foil or application of graphite or molybdenum disulfide.

The combined body of such structure is favorably used for turbocharger rotors and gas turbines.

As clearly shown by various tests and FEM stress analysis, general combined bodies of ceramics and metal have extreme stress concentration observed in the vicinity of an engagement end of a ceramic member.

The combination of part with a smaller frictional coefficient and part with a greater frictional coefficient according to the invention sufficiently relaxes the stress concentration and maintains the high bonding strength.

The combined body of the invention has a smaller frictional coefficient o the engagement end or its vicinity so as to relax the stress concentration and has a greater frictional coefficient on the other part so as to maintain the high bonding strength. The invention thus prevents deterioration of ceramics due to stress concentration and improves anti-torsional strength and anti-slip off strength.

BRIEF DESCRIPTION OF THE DRAWINGS

The invention may be best understood by referring to the following detailed description of the preferred embodiments and the accompanying drawings, wherein like numerals denote like elements and in which.

DETAILED DESCRIPTION OF PREFERRED EMBODIMENTS

Preferred embodiments of the invention are explained according to the drawings.

Since there may be various modifications and changes without departing from the scope of the invention, the embodiments below are not intended to limit the invention to the embodiments but are intended to illustrate the invention more clearly.

Figure 1:
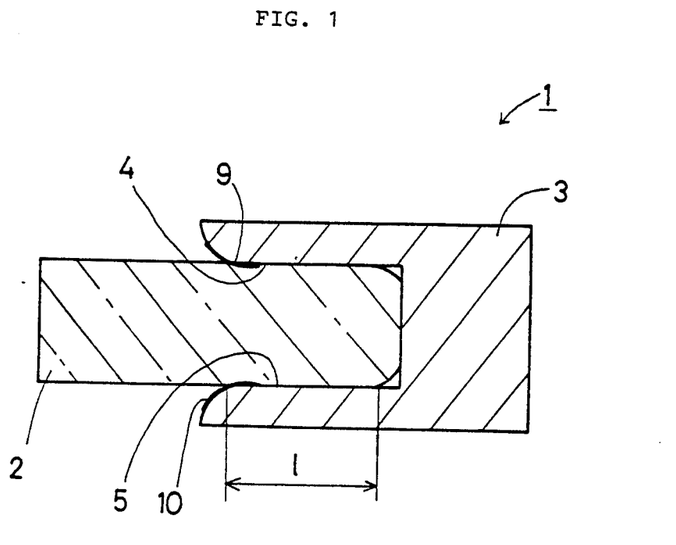
FIG. 1 is a cross sectional view illustrating a combined body of ceramics and metal embodying the invention.

FIG. 1 is a cross sectional view illustrating a combined body 1 of ceramics and metal embodying the invention.

The combined body 1 includes a solid cylindrical ceramic member 2 (15 phi) of silicon nitride and a cylindrical metal member 3 (20 phi) of an alloyed steel with a low thermal expansion factor like Incoloy 903. The ceramic member 2 is engaged with a cylindrical recess 4 of the cylindrical metal member 3 by pressure insertion at room temperature in the atmosphere. An inner face of the recess 4 in contact with the ceramic member 2 or a contact surface 5 of the metal member 3 has a length 1 of three millimeter (the same as a contact surface of the ceramic member 2) with an interference of 75 micrometer.

Embodiments of the combined body including a treated surface region of various shapes are described below.

Embodiment 1

Figure 2:
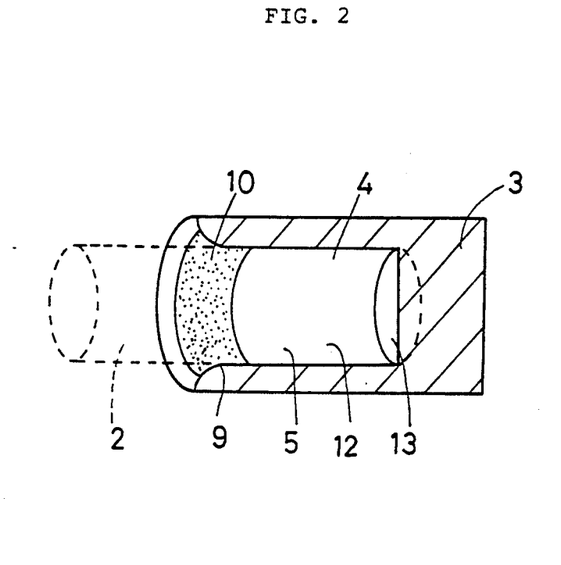
FIG. 2 is a partly broken perspective view illustrating a combined body which includes a treated surface region on a metal member.

In this embodiment, the combined body 1 has a treated surface region 10 on the contact surface 5 of the metal member 3 as shown in FIG. 2. The treated surface region 10 is a band with a smaller frictional coefficient, which includes an engagement end 9 and is formed on the opening of the recess 4. The treated surface region 10 on the circumference of the contact surface 5 is first covered with a nickel strike plated layer of one micrometer thick and then plated with silver of five micrometer thick and one millimeter wide from the engagement end 9.

The contact surface 5 also has an untreated band 12 of two millimeter wide for improving anti-torsional strength and anti-slip off strength. The area of the untreated band 12 occupies sixty seven percent of the ring contact surface 5 except a bottom 13.

Embodiment 2

Figure 3:
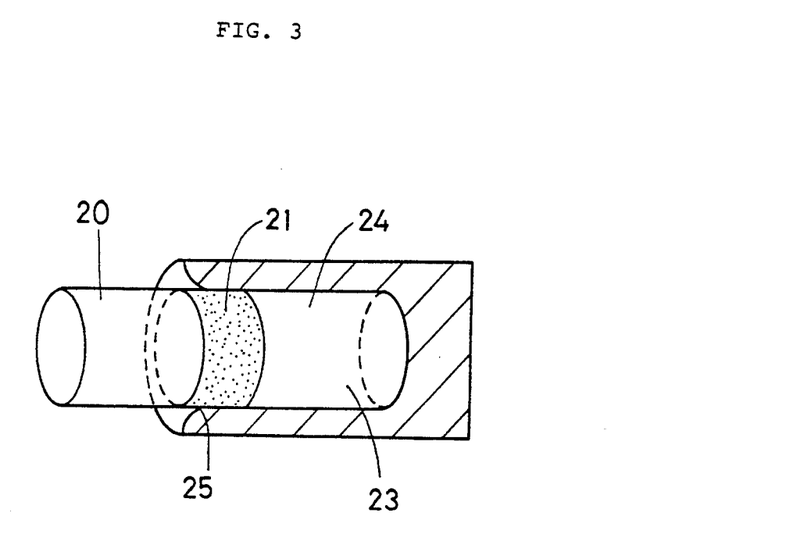
FIG. 3 is a partly broken perspective view illustrating a combined body which includes a treated surface region on a ceramic member.

In this embodiment, the combined body 1 has a treated surface region 21 on a ceramic member 20 as shown in FIG. 3. The treated surface region 21 is a band with a smaller frictional coefficient, which includes an engagement end 25 and is formed on a contact surface 23 of the ceramic member 2. The treated surface region 21 on the circumference of the contact surface 23 is covered with molybdenum disulfide of one millimeter wide from the engagement end 25. The ceramic member 20 also includes an untreated region 24 which occupies sixty seven percent of the ring contact surface 23.

Embodiment 3

Figure 4:
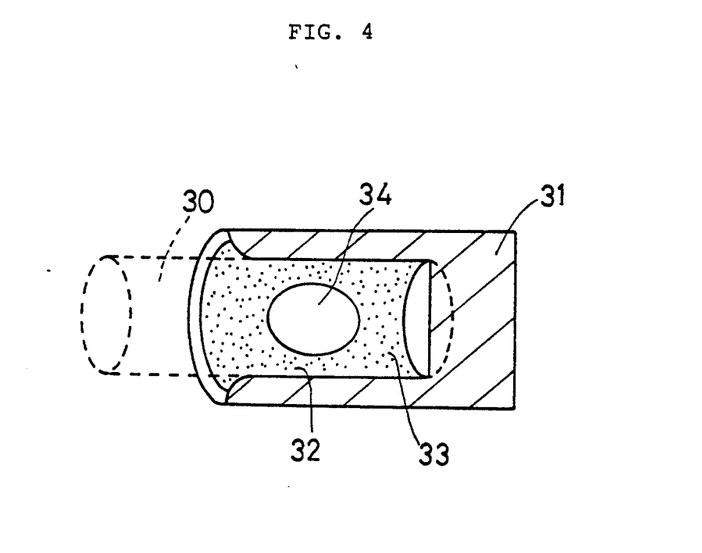
FIG. 4 is a partly broken perspective view illustrating another combined body which includes a treated surface region on a metal member.

In this embodiment, the combined body 1 has a treated surface region 32 on a metal member 31 which a ceramic member 30 is engaged with as shown in FIG. 4. The treated surface region 32 on the circumference of a contact surface 33 is plated with silver in the same manner as the embodiment 1. The metal member 31 includes plural untreated spots 34 which are surrounded by the treated surface region 32 and occupy forty five percent of the contact surface 33.

Embodiment 4

Figure 5:
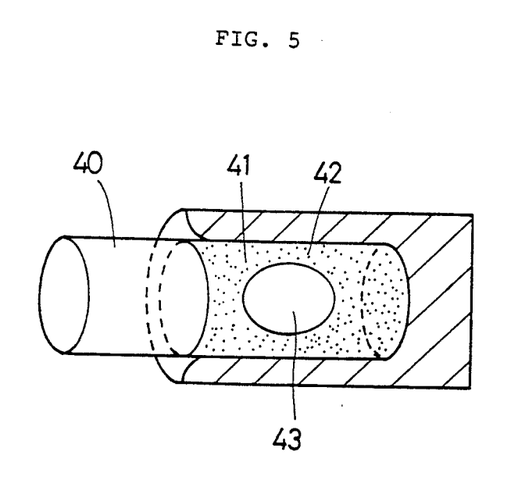
FIG. 5 is a partly broken perspective view illustrating another combined body which includes a treated surface region on a ceramic member.

In this embodiment, the combined body 1 has a treated surface region 41 on a ceramic member 40 as shown in FIG. 5. The treated surface region 41 on the circumference of a contact surface 42 is covered with molybdenum disulfide in the same manner as the embodiment 2. The ceramic member 40 includes plural untreated spots 43, which are surrounded by the treated surface region 41 and occupy forty five percent of the contact surface 42.

In the embodiments 3 and 4, the combined body 1 may have two untreated spots 34 or 43 opposite to each other or four untreated spots perpendicular to each other. The number and position of the untreated spots are not limited as long as the conditions above are fulfilled.

The advantages of the embodiments were identified by the following test.

Test

Three combined bodies according to the embodiment 1 and three according to the embodiment 2 were respectively manufactured as examples 1 through 3 and 4 through 6 and evaluated. Table 1 shows results of the test of limit bending stress at a heat cycle and anti-torsional strength at room temperature and during heating to 450° C.

Combined bodies with the whole contact surface of the metal member plated with silver (references 7 through 9), those with the whole contact surface of the ceramic member covered with molybdenum disulfide (references 10 through 12), and those without any heat treatment (references 13 through 17) were also manufactured and evaluated in the same manner. The results are also shown in Table 1.

TABLE 1

| No. | LIMIT BENDING STRESS AT COLD CYCLE (kg/mm$^2$) | ANTI-TORSIONAL STRENGTH (kg-m) | |
|---|---|---|---|
| | | ROOM TEMPERATURE | HEATING |
| EXAMPLES | | | |
| 1 | 40 or above | 6.0 or above | 6.0 or above |
| 2 | 40 or above | 6.0 or above | 6.0 or above |
| 3 | 40 or above | 6.0 or above | 6.0 or above |
| 4 | 40 or above | 6.0 or above | 6.0 or above |
| 5 | 40 or above | 6.0 or above | 6.0 or above |
| 6 | 40 or above | 6.0 or above | 6.0 or above |
| REFERENCES | | | |
| 7 | 40 or above | 6.0 or above | 1.7 |
| 8 | 40 or above | 6.0 or above | 1.5 |
| 9 | 40 or above | 6.0 or above | 1.6 |
| 10 | 40 or above | 2.8 | 2.4 |
| 11 | 40 or above | 3 0 | 2.2 |
| 12 | 40 or above | 2.5 | 2.5 |
| 13 | 30 | 6.0 or above | 6.0 or above |
| 14 | 20 | 6.0 or above | 6.0 or above |
| 15 | 9 | 6.0 or above | 6.0 or above |
| 16 | 25 | 6.0 or above | 6.0 or above |
| 17 | 13 | 6.0 or above | 6.0 or above |

As clearly seen in Table 1, all the examples 1 through 6 with a surface treatment region in the vicinity of the engagement end had the limit bending stress of 40 or greater at a heat cycle and the anti-torsional strength of 6.0 or greater at room temperature and during heating.

Namely, the combined bodies of ceramics and metal according to the embodiments have excellent properties including sufficient strength.

On the contrary, the references 7 through 12 with the whole contact surface treated had sufficient limit bending stresses at a heat cycle but lower anti-torsional strengths. The references 13 through 17 without any surface treatment had sufficient anti-torsional strengths but smaller limit bending stresses at a heat cycle.

As described above, the combined body of ceramics and metal according to the invention includes both a treated surface region and an untreated region in predetermined positions. Because a compressive force applied to the engagement end is sufficiently reduced, extreme stress concentration on the ceramic member is well prevented and the strength of the combined body is kept high. The structure of the invention also reduces the axial tractive force, thus preventing fatigue or deterioration of the ceramics and thereby maintaining the appropriate strength even under repeated load stress or thermal stress.

When the untreated region occupies thirty five to ninety five percent of the total area of one contact surface, the effect of the invention is exerted favorably.

What is claimed is:

1. A combined body of ceramics and metal including a ceramic member inserted into, and firmly engaged within, a recess of a metal member, and wherein respective contact surfaces of the ceramic member and the metal member are pressure bonded, in which, a load bearing surface of at least one of said metal member and said ceramic member has a treated surface region in the vicinity of an engagement end thereof, and an untreated surface region at a location other than in the vicinity of the engagement end, and wherein said treated surface region has a relatively small frictional coefficient, as compared to said untreated surface region, to prevent stress concentration in a vicinity of said engagement end, and wherein said untreated surface region has a relatively large frictional coefficient, as compared to said treated surface region, to maintain a bonding strength created between said contact surfaces by said pressure bonding.

2. A combined body as claimed in claim 1, in which said ceramic member has a cylindrical body and said metal member has a cylindrical body with a recess or a through hole, and said ceramic member is inserted into the recess or an opening of the through hole of said metal member.

3. A combined body as claimed in claim 1, in which said untreated surface region formed on either said ceramic member or said metal member occupies thirty five to ninety five percent of the contact surface thereof.

4. A combined body as claimed in claim 1, in which said ceramic member and said metal member are bounded to each other by pressure insertion, thermal engagement or cold engagement.

5. A combined body as claimed in claim 3, in which said untreated surface region is a circumferential band along the contact surface.

6. A combined body as claimed in claim 3, in which said untreated surface region is one or plural spots formed on the contact surface.

7. A combined body as claimed in claim 5, in which the band has a width which corresponds to thirty five to ninety five percent of a length l of the contact surface.

8. A combined body of ceramics and metal comprising a ceramic body inserted into and firmly engaged with a recess or an opening of a metal member by pressure bonding said ceramic body and said metal member, in which, a load bearing surface of said metal member has a treated surface region in the vicinity of an engagement end thereof and an untreated surface region at a location other than in the vicinity of the engagement end, and wherein said treated surface region has a relatively small frictional coefficient, as compared to said untreated surface region, to prevent stress concentration in a vicinity of said engagement end, and wherein said untreated surface region has a relatively large frictional coefficient, as compared to said treated surface region, to maintain a bonding strength created between said contact surfaces by said pressure bonding.

9. A combined body as claimed in claim 8, in which said treated surface region is covered with a metal foil by plating, vacuum evaporation, or sputtering.

10. A combined body as claimed in claim 9, in which said metal foil includes silver.

11. A combined body as claimed in claim 8, in which said treated surface region is covered with molybdenum disulfide.

12. A combined body as claimed in claim 8, in which said treated surface region is covered with graphite.

13. A combined body of ceramics and metal comprising a ceramic body inserted into and firmly engaged with a recess or an opening of a metal member by pressure bonding said ceramic body and said metal member, in which, a load bearing surface of said ceramic member has a treated surface region in the vicinity of an engagement end thereof and an untreated surface region at a location other than in the vicinity of the engagement end, and wherein said treated surface region has a relatively small frictional coefficient, as compared to said untreated surface region, to prevent stress concentration in a vicinity of said engagement end, and wherein said untreated surface region has a relatively large frictional coefficient, as compared to said treated surface region, to maintain a bonding strength created between said contact surfaces by said pressure bonding.

14. A combined body as claimed in claim 13, in which said treated surface region is covered with, a metal foil by plating, vacuum evaporation, or sputtering.

15. A combined body as claimed in claim 14, in which said metal foil includes silver.

16. A combined body as claimed in claim 13, in which said treated surface region is covered with molybdenum disulfide or graphite.

17. A turbocharger rotor comprising a combined body of ceramics and metal prepared by engaging an extension of a ceramic member with a metal member and firmly securing respective contact surfaces of the ceramic member and the metal member by pressure bonding said respective contact surfaces, in which, a load bearing surface of at least one of said metal member and said ceramic member has a treated surface region in the vicinity of an engagement end thereof, and an untreated surface region at a location other than in the vicinity of the engagement and, and wherein said treated surface region has a relatively small frictional coefficient, as compared to said untreated surface region, to prevent stress concentration in a vicinity of said engagement end, and wherein said untreated surface region has a relatively large frictional coefficient, as compared to said treated surface region, to maintain a bonding strength created between said contact surfaces by said pressure bonding.

18. A gas turbine comprising a body of ceramic and metal prepared by engaging an extension of a ceramic member with a metal member and firmly binding the ceramic member to the metal member by pressure bonding respective contact surfaces, in which, a load bearing surface of at least one of said metal member and said ceramic member has a treated surface region in the vicinity of an engagement end thereof, and an untreated surface region at a location other than in the vicinity of the engagement end, and wherein said treated surface region has a relatively small frictional coefficient, as compared to said untreated surface region, to prevent stress concentration in a vicinity of said engagement end, and wherein said untreated surface region has a relatively large frictional coefficient, as compared to said treated surface region, to maintain a bonding strength created between said contact surfaces by said pressure bonding.

* * * * *